Figures 1, 2:
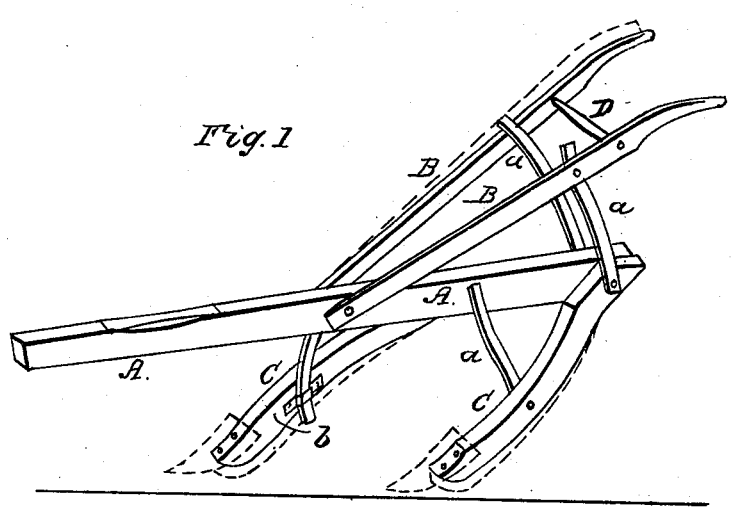

G. H. SMITH.
Cultivator.

No. 107,416.  Patented Sept. 13, 1870.

Witnesses
Croydon E. Fuller
Albert W. C. Weeks

Inventor
George H Smith
by
Thomas G. Orwig
Attorney.

UNITED STATES PATENT OFFICE.

GEORGE H. SMITH, OF DES MOINES, IOWA.

IMPROVEMENT IN CULTIVATORS.

Specification forming part of Letters Patent No. 107,416, dated September 13, 1870.

I, GEORGE H. SMITH, of Des Moines, in the county of Polk and State of Iowa, have invented certain Improvements in Cultivators, of which the following is a specification:

My invention consists in simplifying the construction of cultivators by pivoting the handles, and also the standards, directly to the beam with bolts, in such a manner as to gain the following-named advantages:

First, making the handles adjustable, so that they can be regulated to suit the different-sized persons holding them; second, making the standards, with their shovels, adjustable, so that they can be set at various angles, and adapted to work equally well in various kinds and conditions of soil; third, making the handles and the standards adjustable, so that they can be folded parallel with the beam, for convenience and economy of space in packing and shipping; fourth, making all the adjusting wrought-iron braces of uniform size, and using the same as washers as well as braces; fifth, securing a direct line of draft on the shovels, and avoiding all twisting force on the standards, by attaching each brace with a loop on the inside of the standard.

Figure 1 is a perspective view of my cultivator, standing adjusted as required for use.

A A is the beam; B B, the handles; C C, the standards. These are of uniform size, but rights and lefts, and curved so as to stand apart and away from the beam. D is a round or brace to connect the handles near the top, and may be made of wood or iron. *a a a a* represent the four adjusting-braces, secured in their positions with bolts and nuts, excepting where they are connected with the standards by the use of the iron loops and wooden pins, such as are in common use for the purpose.

When a shovel strikes an unyielding object the wooden pin is cut off by the combined action of the iron brace and the iron loop, and the cultivator thereby instantly relieved of all strain.

The same bolts used for pivoting the handles and the standards are also used to hold the adjusting-braces. Each of these braces has two or more holes in one end, such as are in common use for the purpose of lengthening and shortening the braces in position. *b* is one of the iron loops fastened to the inside of the standard. These loops are formed of a piece of flat bar-iron, bent up in the middle, with holes in the ends by which to fasten them, and with a hole in the center through which the wooden pin is projected. They may vary in form and size, and may be cast metal. By the use of these loops I avoid the necessity of a mortise or slot in the standards, and secure a direct line of draft from the beams to the standards, thereby preventing all lateral or twisting force upon the standards and shovels.

The dotted lines show the position for the shovels and indicate how the handles and standards may be raised or lowered.

Fig. 2 represents my cultivator folded ready for packing and shipping.

All that is required to do this is to remove the nuts from the bolts at the top of the handles, and free the handles and turn them forward parallel with the beam, and then return the nuts to their places on the bolts; next drive the wooden pins outward far enough to free the braces from the standards, and then turn the standards and all the braces parallel with the beam. All the parts of the cultivator thus remain connected in a compact form.

I am aware that adjusting-braces similar to mine have been used on cultivators; but my mode of adjusting and bracing each of the handles and standards with braces of uniform size, as specified, so that the cultivator can be readily regulated for use, and easily folded compactly for shipping, is new and greatly advantageous.

I am also aware that curved standards and iron loops for attaching the adjusting-braces to the sides of the standards have been in use.

I claim as my invention—

The beam A, the handles B B, braces *a a a a*, and loop *b*, arranged as described, and for the purpose set forth.

GEORGE H. SMITH.

Witnesses:
 CORYDON E. FULLER,
 ALBERT W. C. WEEKS.